UNITED STATES PATENT OFFICE.

GEORGE R. EVANS, OF SAN FRANCISCO, CALIFORNIA, ASSIGNOR OF ONE-HALF HIS RIGHT TO GARRETT R. HOPPER, OF SAME PLACE.

IMPROVEMENT IN NON-CONDUCTING COMPOUNDS.

Specification forming part of Letters Patent No. 206,007, dated July 16, 1878; application filed June 11, 1878.

*To all whom it may concern:*

Be it known that I, GEORGE R. EVANS, of the city and county of San Francisco, and State of California, have invented a Fire-Resisting and Non-Conducting Compound; and I do hereby declare the following to be a full, clear, and exact description thereof.

My invention relates to a novel substance or compound which is useful as a lining for furnaces and other places which are to be exposed to a high degree of heat, and also as a non-conducting protector or covering for the outside of steam-boilers, pipes, and for all purposes in which a non-conductor is needed. As a lining for safes and vaults it is especially valuable.

I employ as a base and principal part of my non-conductor petrified wood, which is obtainable in large quantities in some localities. This material I crush, grind, and pulverize or otherwise reduce to a suitable condition of fineness. I then mix it with mica and talc in certain proportions, and add any substance to make a pasty mass and give the necessary coherence. This may be effected by the use of wet clay or plaster. Either of these may be used or any equivalent substance to form the compound, the essential requisite of which is a pasty or coherent condition which will allow the material to be evenly and smoothly applied, and will give it a tenacity sufficient to retain it in place after it is put on.

The proportions which I have found best suited to my purpose are three or four parts of the petrified wood finely pulverized, one part of pulverized mica, and one part of pulverized talc. These are mixed with sufficient clay or other substance to make a pasty mass, and may be applied to the boiler or pipes directly.

It will be seen that in the form of blocks, or in some cases laid on in sheets, my non-conducting compound may be applied to furnaces or rooms as a non-conducting wall.

In some cases I employ one part of asbestus with the above substances, and the proportions may be somewhat varied without essentially changing the character of my compound; and when employed as a covering I use a small proportion of plaster-of-paris to give it a smooth surface and finish.

Having thus described my invention, what I claim, and desire to secure by Letters Patent, is—

A fire-resisting and non-conducting compound, consisting of petrified wood as a base, in combination with mica and talc in certain proportions, combined with a coherent tenacious material, substantially as and for the purpose herein specified.

In witness whereof I have hereunto set my hand.

GEORGE R. EVANS.

Witnesses:
FRANK A. BROOKS,
WALTER C. BEATIE.